Figure 1:
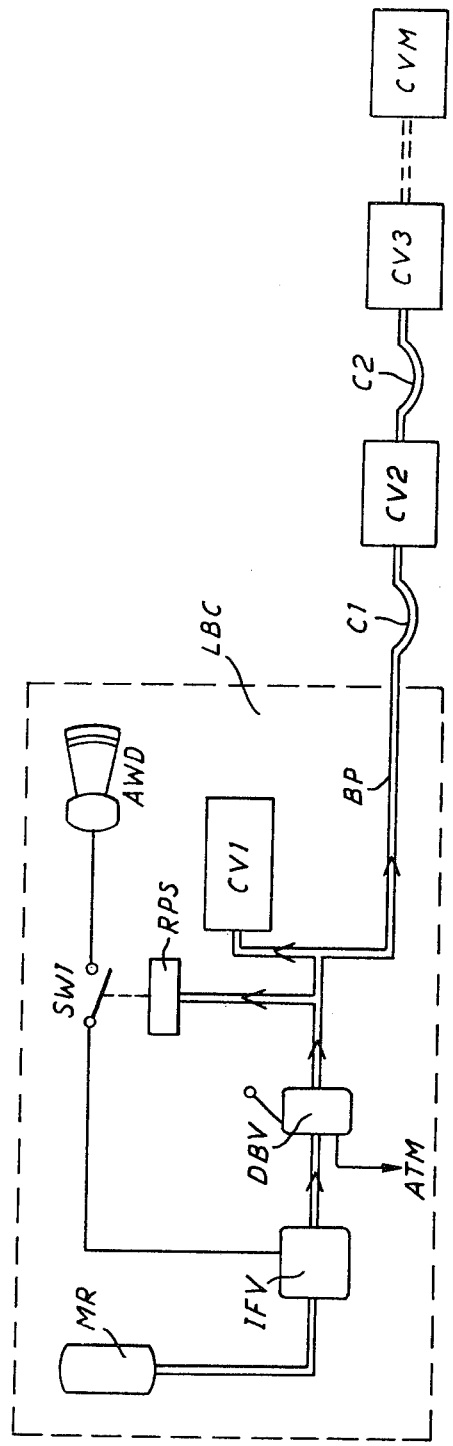

United States Patent [19]

Wickham

[11] 4,319,787
[45] Mar. 16, 1982

[54] RAIL VEHICLE BRAKING APPARATUS

[75] Inventor: David J. Wickham, Chippenham, England

[73] Assignee: Westinghouse Brake and Signal Co. Limited, Chippenham, England

[21] Appl. No.: 119,770

[22] Filed: Feb. 8, 1980

[30] Foreign Application Priority Data

Feb. 20, 1979 [GB] United Kingdom ............... 06026/79

[51] Int. Cl.³ ............................................ B60T 17/22
[52] U.S. Cl. ......................................... 303/86; 303/1
[58] Field of Search ...................... 116/268; 303/1, 75, 303/84 A, 84 R, 86

[56] References Cited

U.S. PATENT DOCUMENTS 2,042,094  5/1936  Good ...................................... 303/86
3,966,272  6/1976  Wickham ............................ 303/86 X Primary Examiner—Duane A. Reger
Attorney, Agent, or Firm—Larson and Taylor

[57] ABSTRACT

A rail vehicle braking apparatus which operates with brake control valves on successive vehicles of a train controlled by pressure in a brake pipe extending along the train has warning means responsive to rising brake pipe fluid flow to warn of possible non-released brakes in the train and the warning means being inhibited by a rising fluid pressure-sensing means to prevent an undesired warning due to brake pipe fluid flow during release of the brakes.

5 Claims, 2 Drawing Figures

RAIL VEHICLE BRAKING APPARATUS

This invention relates to rail vehicle braking and relates especially to warning means for braking apparatus which operates under the control of the pressure in a brake pipe which extends along a train of vehicles to govern the operation of the brake valves on successive such vehicles.

Rail vehicle braking apparatus is known which includes a brake valve usually in the locomotive or leading car of a train and a brake pipe extending therefrom along the train, the pressure in which governs the operation of control valves on the respective vehicles to control the vehicle brakes. Often, full brake release is effected by a fully charged brake pipe and reductions of brake pipe pressure cause desired braking. The brake valve maintains the brakes released by maintaining a fixed pressure at its output to the brake pipe from a main supply reservoir. A problem encountered with such braking apparatus is that it is possible for a fault to occur at a point along the brake pipe without the driver or the control system of the train being made aware of it. Such a fault may consist of a newly developed leak in the rear of a train and this can lead to brakes in the region of the leak failing to release. The result can be worn brakes or badly damaged wheels.

The present invention provides a rail vehicle braking apparatus with a brake pipe extending along a train from one vehicle to another vehicle, successive such vehicles having brake control valves for controlling the brakes in response to pressure changes in the brake pipe, brake pipe flow warning means on one vehicle including an increasing fluid flow sensor, means responsive to sensed increasing fluid flow in the brake pipe for operating a warning device to give a warning of an occurrence of abnormal fluid flow, pressure-responsive means responsive to changing brake pipe pressure occurring during release of the brakes and inhibiting means operable by the pressure-responsive means to inhibit the warning means for prevention of a warning during such release of the brakes.

In a system in which a brake application is effected by a reduction of brake pipe pressure and a brake release is effected by restoring the brake pipe pressure to a fully charged value, the inhibiting means is arranged to respond to a rising brake pipe pressure.

Figure 2:
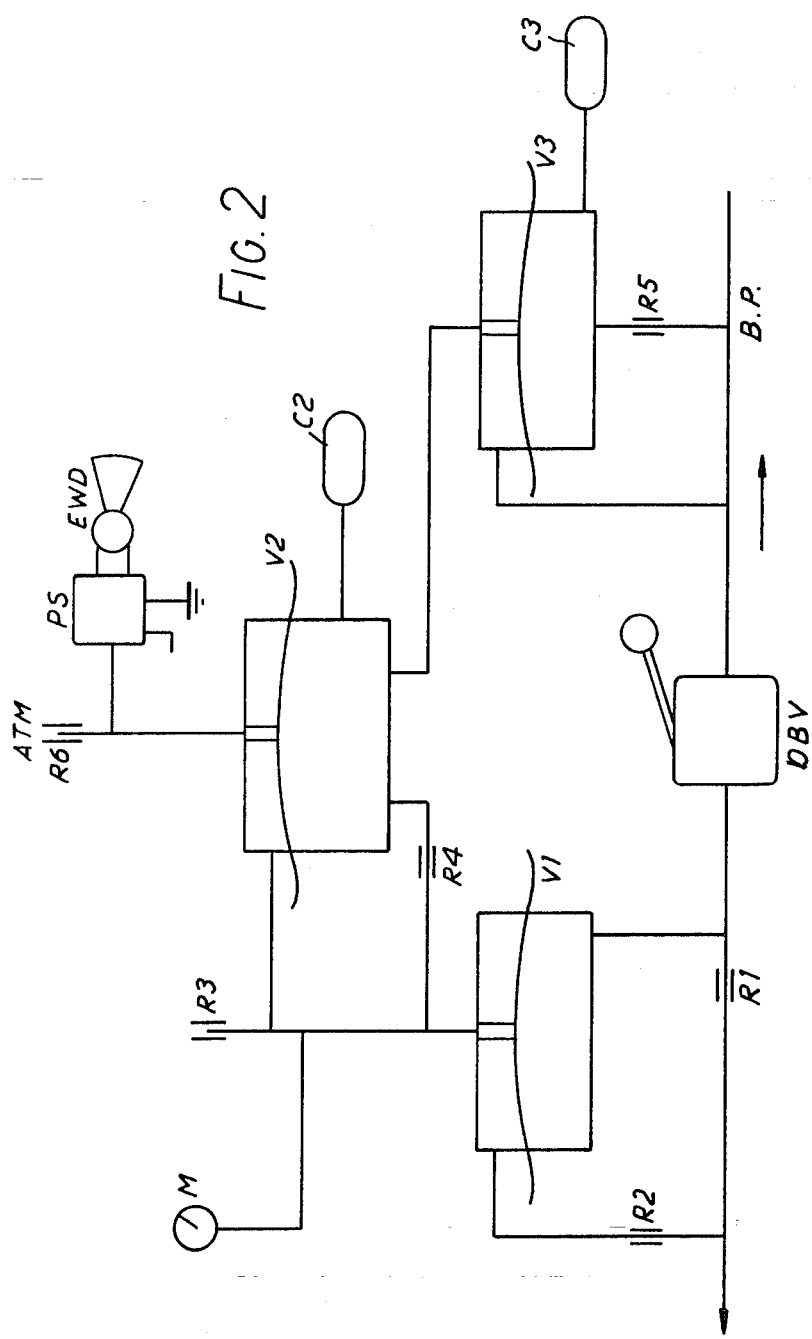

In order that the present invention may be clearly understood and readily carried into effect, the same will be further described by way of example, with reference to the accompanying drawing of which:

FIG. 1 illustrates in block schematic form the relevant parts of a braking system embodying the present invention, and FIG. 2 is a diagrammatical representation of part of an alternative system employing pneumatic increasing flow detection.

Referring to FIG. 1 of the drawing, the portion of the schematic arrangement which is shown and which is contained within the dotted outline LBC, represents the locomotive braking circuit and it will be seen that this has a brake pipe BP to which the brake valve CV1 on the locomotive is connected and thereafter successive brake valves CV2, CV3 . . . CVM, are connected via intercar couplers C1, C2, etc. The braking system is assumed to be a braking system which operates by controlling the pressure in the brake pipe BP. The brake valves on the locomotive and on each successive vehicle each consist of a triple valve with an associated auxiliary reservoir charged during charging of the system from the brake pipe itself and the said triple valve operating in response to subsequent reductions of brake pipe pressure in relation to the auxiliary reservoir pressure, to apply air from the respective auxiliary reservoirs to the respective brake cylinders. The triple valve subsequently laps to a condition where the auxiliary reservoir pressure is thus reduced to a level corresponding to the brake pipe pressure with an appropriate degree of brake cylinder pressure acting to apply the brakes. Such systems are well-known and such brake valves are known as the ABD valve, manufactured by the Westinghouse Air Brake Company, or the Z1A control valve, manufactured by the Westinghouse Brake and Signal Company. Other forms of braking system which utilise changes of brake pipe pressure are also well-known and need not be discussed further. It will be appreciated that in order to effect brake release, it is necessary to establish a recovery of brake pipe pressure and any loss of air from the brake pipe at a point along the train, especially if such a point is remote from the locomotive, can give rise to unreleased brakes, such condition not being readily apparent to the driver of the locomotive.

In view of the foregoing, it is therefore desirable that means should be provided for detecting changes of the flow of air in the brake pipe from the main reservoir MR on the locomotive during times when such flow change should not be occurring. It is to be appreciated that the brake valve will be such as to supplement the brake pipe air to combat normal steady leakage therefrom.

In the arrangement shown, the main reservoir MR is connected via an increasing flow rate-responsive valve IFV to the driver's brake valve DBV. The increasing flow rate valve IFV is provided with a pressure-responsive device having electrical switch contacts via which a warning device AWD is signalled. The output of the driver's brake valve DBV is connected as indicated to the brake pipe and also to the brake valve CV1. In addition, a rising pressure-sensing device RPS is provided which controls a switch SW1 in the electrical connection between increasing flow valve IFV and the warning device AWD. The warning device may be audible and/or visible such as to indicate to the driver that a possible dangerous condition exists.

In normal operation, assuming that no appreciable rate of change of flow of air is occurring through the increasing flow valve IFV, with a normally fully charged system, the increasing flow valve IFV will produce no electrical signal to the switch SW1 but the switch SW1 will be in the closed condition which is opposite to that shown, as the output pressure of the driver's brake valve DBV will not be a rising pressure.

On a service application of the brakes, the driver's brake valve DBV is operated and a certain reduction of pressure in the brake pipe BP is thereby effected by venting to atmosphere. During such an application, although there is an initial reverse flow via DBV, followed by a reinstatement of forward leakage flow, the rate of rise of this is not usually sufficient to operate the increasing flow valve. The increasing flow valve IFV therefore remains unoperated and produces no signal to the device AWD.

On returning the driver's brake valve DBV to the brake release position, air commences to flow via the flow valve IFV and pressure immediately begins to rise at the output of the driver's brake valve and is sensed by the rising pressure-sensing device RPS to open the switch SW1. Thus the flow valve, while operated to sense the flow from the main reservoir, is inhibited by SW1 against operating warning device AWD. After a short interval of time, the pressure in the brake pipe BP at the locomotive attains its fully charged level and the rate of increase of flow becomes substantially zero but reducing flow continues down the brake pipe to the remainder of the train while the braking valves at the more remote vehicles of the train are continuing to recharge and release the respective brakes. The flow valve IFV ceases to produce a signal to the switch SW1 before the switch SW1 closes so that despite no rising pressure, the continuing flow does not give rise to a warning operation of AWD.

It may be appreciated by those skilled in the art that the warning parts of apparatus described in the foregoing may be integrated with other warning means provided in the locomotive and audible or visual indications could be provided as to the nature of the fault to which the audible warning device is responding.

In the event of an abnormal change of the leakage occurring during normal recovery, due say to a failed pipe coupler, the resultant rise of brake pipe flow via the valve DBV in the absence of rising pressure causes operation of AWD.

In the event of such a fault during a steady brake application, the same result is produced but in the unlikely event of such a fault occurring precisely during a period when the brake pipe pressure is rising to release the brakes, because such rise is such as to inhibit a warning, without additional control parameters the system is unable to operate to produce a warning resulting from extra flow rise which results. Nevertheless, such periods are so short as to be relatively insignificant in relation to the remainder of the operating time during which the system will produce an almost immediate warning of occurrence of more than a normal leakage.

It will be recalled from the foregoing that on initiation of a brake application, the brake pipe flow temporarily tends to reverse via DBV with the result that the flow through IFV falls to zero. As the pressure in BP stabilises towards the lower set pressure, the forward flow, due to normal leakage, recovers and since the pressure however is not rising, there may be nominal rate of increase of flow up to which the system should be designed not to respond to give a warning.

One form of pneumatically operable warning arrangement employing the present invention is shown in FIG. 2, which shows a portion of the pipe BP leading out of the brake valve DBV supplied from a main reservoir MR as before. Pneumatically operated diaphragm valves V1, V2 and V3 each comprise a chamber divided by a flexible wall in the form of a diaphragm which can move against an outlet port on one side as a result of excess pressure on the other side.

Valve V1 has one side of the diaphragm connected to a point downstream of a restriction R1 in the flow path from the main reservoir to the valve DBV. The other side of the diaphragm is connected via a further restriction R2 to a point upstream of the first restriction. The output flow port of V1 is connected to one side of valve V2, also via a third restriction R3 to atmosphere, and via a fourth restriction R4 to the other side of V2. The output flow port of V2 is connected to atmosphere via a minimal restriction R6. A connection upstream of R6 is made to a pressure switch PS which, when operated, connects an electrical supply to the electrical warning device EWD. A pressure meter M may also be included if required, connected upstream of R3 for visible indications.

In order to sense rising brake pipe pressure, the valve V3 has its output side connected to a point downstream of DBV, which point is also connected at the other side of the diaphragm of V3 via a restriction R5.

Both V2 and V3 are provided with capacities designated C2 and C3, respectively, dimensioned to afford the requisite operating characteristics.

In operation of the arrangement of FIG. 2, fluid flow via DBV gives rise to a sensible pressure gradient across restriction R1, the pressure upstream of R1 being greater than the pressure downstream of R1. The pressure upstream of R1 is shared between R2, the restriction generated by the diaphragm valve V1 and the restriction R3, and the pressure produced upstream of R4 represents flow rate via R1. An increase or decrease of this pressure represents increasing or decreasing flow rate via R1 in the brake pipe BC and (disregarding the effect of V3) an increase of flow in R1 gives rise to opening of the diaphragm valve V2 to produce an output pressure to operate the warning device. Such operation is inhibited however by the operation of V2 in the event of the brake pipe pressure rising since such a rise causes the diaphragm valve V3 to open to apply air at or near brake pipe pressure to the underside of the diaphragm of valve V2 to prevent opening of the valve V2 regardless of the rate of pressure rise which may occur upstream of R3. In order to achieve this, it will be appreciated that R1, R2, R3 and R4 are selected so that pressure changes which can be transmitted to R4 are insignificant in relation to the inhibition pressures which are transmitted to V2 via V3.

Having thus described our invention what we claim is:

1. A rail vehicle braking apparatus with a brake pipe extending along a train from one vehicle to another vehicle, successive such vehicles having brake control valves for controlling the brakes in response to pressure changes in the brake pipe, brake pipe flow warning means on one vehicle including an increasing fluid flow sensor, and means responsive to sensed increasing fluid flow in the brake pipe for operating a warning device to give a warning of an occurrence of abnormal fluid flow, a pressure-responsive means, operable independently of said fluid flow sensor, which is responsive to changing brake pipe pressure occurring during release of the brakes and inhibiting means operable by the pressure-responsive means to inhibit the warning means for prevention of a warning during such release of the brakes.

2. Apparatus as claimed in claim 1, wherein the increasing fluid flow sensor is included in a fluid pressure line which carries a supply input to a brake valve which is operable to control the pressure in the brake pipe whereas the pressure-responsive means is connected to the brake pipe downstream of the brake valve.

3. Apparatus as claimed in claim 1 or 2, wherein the vehicle's brakes are such as to be applied by the respective control valves upon reduction of brake pipe pressure from a charged value of pressure and the pressure-responsive means being responsive to rising brake pipe pressure corresponding to release of the brakes.

4. Apparatus as claimed in claim 1 or 2, the increasing fluid flow sensor including a first restriction, a diaphragm valve, one input to which is connected via a second restriction to a point upstream of the first restriction and a second input to which is connected to a point downstream of the first restriction, the output of the diaphragm valve resulting from flow via the second restriction, via a third restriction and a point upstream of third restriction, being connected to a pressure change sensor.

5. Apparatus as claimed in claim 4, wherein the pressure change sensor comprises a further diaphragm valve having a first input connected to said point upstream of the third restriction via a fourth restriction, and a second input connected to said point upstream of the third restriction such that the pressure change sensor produces an output pressure signal in the event of rising pressure upstream of the third restriction.

* * * * *